(12) United States Patent
Wilkerson et al.

(10) Patent No.: US 7,871,553 B2
(45) Date of Patent: Jan. 18, 2011

(54) PROCESS FOR FORMING CURVED THERMOPLASTIC COMPOSITE MATERIAL

(75) Inventors: Randall D. Wilkerson, O'Fallon, MO (US); Alexander M. Rubin, St. Louis, MO (US); James R. Fox, Florissant, MO (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 11/859,057

(22) Filed: Sep. 21, 2007

(65) Prior Publication Data

US 2009/0078362 A1 Mar. 26, 2009

(51) Int. Cl.
*B29C 53/00* (2006.01)
*B29C 55/00* (2006.01)
*B29C 45/00* (2006.01)
*B28B 5/02* (2006.01)

(52) U.S. Cl. .................. 264/285; 264/294; 264/295; 264/339

(58) Field of Classification Search ................. 264/285, 264/294–295, 339
See application file for complete search history.

(56) References Cited

U.S. PATENT DOCUMENTS

| | | | | |
|---|---|---|---|---|
| 4,151,031 A | * | 4/1979 | Goad et al. ............... | 156/201 |
| 5,043,128 A | * | 8/1991 | Umeda ..................... | 264/258 |
| 5,820,804 A | * | 10/1998 | Elmaleh .................... | 264/167 |
| 2005/0056362 A1 | * | 3/2005 | Benson et al. ............. | 156/163 |
| 2007/0175572 A1 | * | 8/2007 | Rubin et al. .............. | 156/196 |
| 2007/0175575 A1 | * | 8/2007 | Rubin et al. .............. | 156/221 |

OTHER PUBLICATIONS

U.S. Appl. No. 11/584,923, filed Oct. 20, 2006, Rubin et al.
U.S. Appl. No. 11/699,653, filed Jan. 29, 2007, Fox et al.
U.S. Appl. No. 11/701,789, filed Feb. 3, 2007, Wilkerson et al.
U.S. Appl. No. 11/697,378, filed Apr. 6, 2007, Rubin et al.
U.S. Appl. No. 11/347,122, filed Feb. 2, 2006.

* cited by examiner

*Primary Examiner*—Khanh Nguyen
*Assistant Examiner*—Matthew Hoover
(74) *Attorney, Agent, or Firm*—Tung & Associates

(57) ABSTRACT

A process for forming curved thermoplastic composite material. According to an illustrative embodiment, the process includes providing a length of straight thermoplastic material; pre-forming the length of straight thermoplastic material into a selected cross-sectional configuration; pressing the length of the straight thermoplastic material; and imparting a curved shape to the length of straight thermoplastic material by providing a curved section and passing the length of straight thermoplastic material through the curved section of a process assembly.

23 Claims, 3 Drawing Sheets

PROCESS FOR FORMING CURVED THERMOPLASTIC COMPOSITE MATERIAL

RELATED APPLICATIONS

This application is related to U.S. patent application Ser. No. 11/347,122, filed Feb. 2, 2006, Ser. No. 11/584,923, filed Oct. 20, 2006, Ser. No. 11/699,653, filed Jan. 29, 2007, Ser. No. 11/701,789, filed Feb. 3, 2007 and Ser. No. 11/697,378 filed Apr. 6, 2007.

TECHNICAL FIELD

This disclosure generally relates to fabrication processes using plastic materials, and more specifically to a process for forming curved thermoplastic composite material from straight material stacks or spools.

BACKGROUND

Numerous processes exist for the fabrication of Thermoplastic composite (TPC) laminates of constant thickness and straight length. In addition to non-continuous processes such as pressing, stamping and autoclave forming, continuous processes exist, such as extrusion, pultrusion, roll forming, and compression molding. Although these latter processes may capable of producing parts in continuous lengths, they lack the ability to produce parts having varying thickness and/or curvature along their length that may be needed for lightweight aerospace structures and other structures where weight may be of particular importance. Moreover, these continuous fabrication processes rely on the in-feed of multiple discrete lengths of TPC materials to form features of an individual part. Thus, the discrete lengths of TPC must be cut, sorted, labeled, stored and individually fed into the machine performing the continuous fabrication process. The use of discrete lengths of TPC material reduces automation of the fabrication process, increases factory space requirements and may add to material costs. In the fabrication of curved thermoplastic parts, use of a material stack that may be pre-cut to the curved shape results in a less efficient use of material.

Accordingly, a need exists for a process for forming curved thermoplastic composite parts from straight material stacks or spools. Illustrated embodiments of the disclosure are intended to satisfy this need.

Other features, benefits and advantages of the embodiments will become apparent from the following description, when viewed in accordance with the attached drawings and appended claims.

SUMMARY

The disclosure is generally directed to a process for forming curved thermoplastic composite material. According to an illustrative embodiment, the process includes providing a length of straight thermoplastic material; pre-forming the length of straight thermoplastic material into a selected cross-sectional configuration; pressing the length of straight thermoplastic material; and imparting a curved shape to the length of straight thermoplastic material by providing a curved section and passing the length of straight thermoplastic material through the curved section.

BRIEF DESCRIPTION OF THE ILLUSTRATIONS

DETAILED DESCRIPTION

The illustrated embodiments provide a novel fabrication process for forming curved thermoplastic composite ("TPC") laminate material in a continuous process. The embodiments find applicable uses in a wide variety of potential applications, including for example, in the aerospace industry. The disclosed process may be ideally suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, the process will initially be described in reference to forming and consolidating a U-section curved thermoplastic composite material segment 18 for use in a commercial aircraft fuselage. However, while an U-section is shown, other stiffened member geometries such as J-section, I-section, T-section, etc. having curvature along their length will also be later described.

Figure 1:
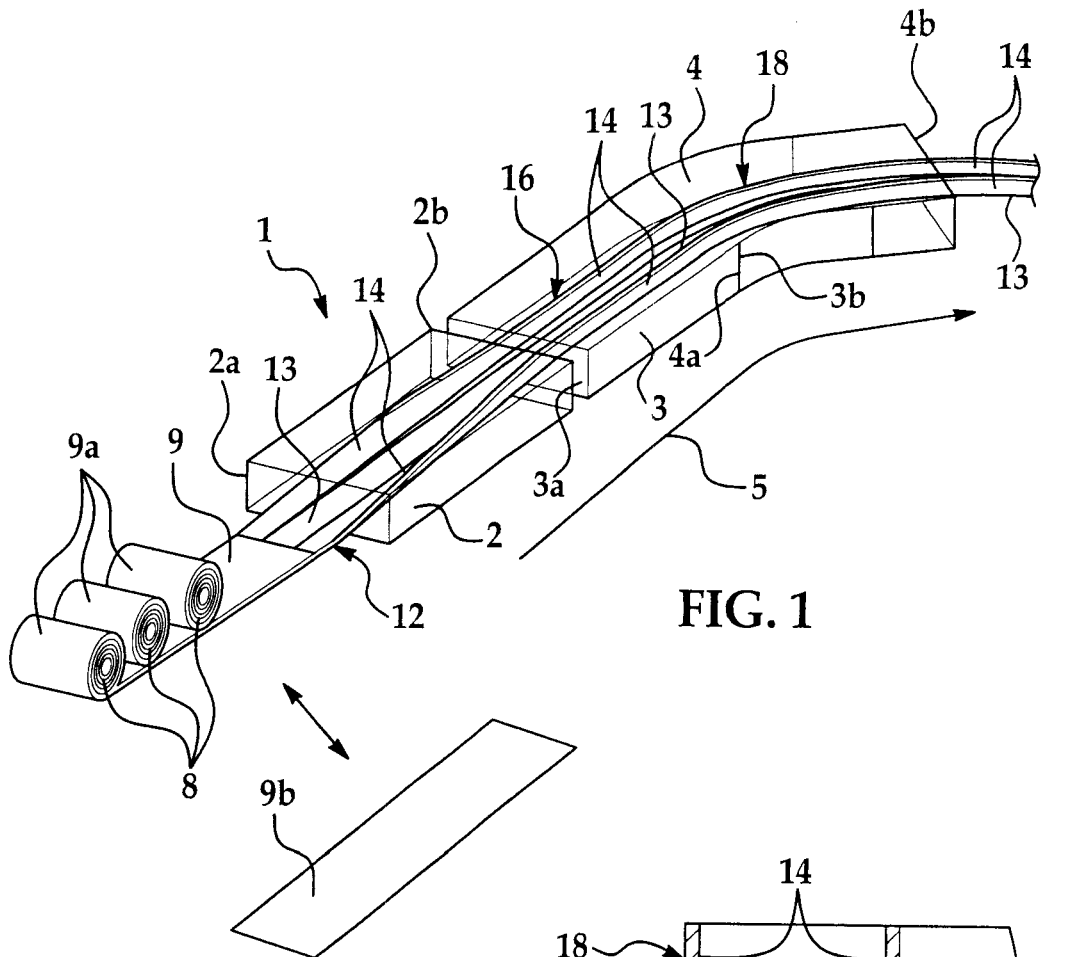
FIG. 1 is a perspective view of a process assembly in implementation of the process for forming curved thermoplastic parts.

Referring initially to FIGS. 1-3 and FIG. 7 of the drawings, a process assembly 1 which may be suitable for implementation of the process for forming curved thermoplastic composite parts is shown in FIG. 1. A process flow direction for the process assembly 1 is designated by the arrow 5. The process assembly 1 may have a pre-forming unit 2, a press 3 and a curved section 4 which may be provided in sequential relationship with respect to each other. As will be hereinafter described, the process assembly 1 forms a curved thermoplastic composite material segment 18 having a selected cross-sectional configuration, length and radius of curvature from a thermoplastic composite material blank 9.

The pre-forming unit 2 of the process assembly 1 may have an intake end 2a and an outlet end 2b. The intake end 2a of the pre-forming unit 2 may be adapted to receive a continuous supply of the thermoplastic composite material blank 9 in any defined layup. The thermoplastic composite material blank 9 may be supplied to the intake end 2a of the pre-forming unit 2 in the form of spool-rolled material 9a which may be wound on one or multiple spools 8. Alternatively, the thermoplastic composite material blank 9 may be supplied to the intake end 2a of the pre-forming unit 2 in the form of stacked material 9b. The thermoplastic composite material blank 9 may include, for example, one or more layers or plies of unidirectional tape; woven cloth; or a hybrid combination of the two.

The pre-forming unit 2 may form the thermoplastic composite material blank 9 into a selected cross-sectional configuration depending on the particular application of the curved thermoplastic composite material segment 18 which may be formed from the thermoplastic composite material 9. In the example shown in FIGS. 1-3, the pre-forming unit 2 forms the thermoplastic composite material blank 9 into a U-shaped cross-sectional configuration; however, it is to be understood that the pre-forming unit 2 may be adapted to form the thermoplastic composite material blank 9 into an I-shaped cross-section (FIG. 4); a T-shaped cross-section (FIG. 5); a J-shaped cross-section (FIG. 6); or any other desired cross-sectional configuration. The pre-forming unit 2 may have any design known to those skilled in the art which may be suitable for imparting the desired cross-sectional configuration to the thermoplastic composite material blank 9.

Figure 2:
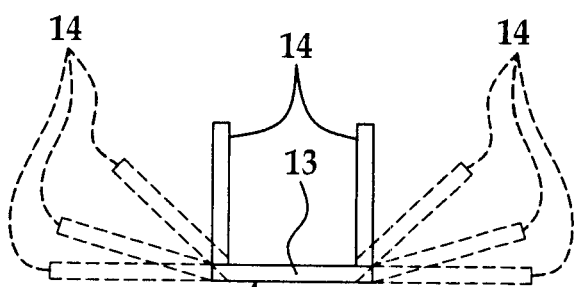
FIG. 2 is an end view of a pre-formed material segment, illustrating pre-forming of the material segment into a selected cross-sectional shape.

As shown in FIG. 2, the intake end 2a of the pre-forming unit 2 may receive the flat or planar thermoplastic composite material blank 9. In the pre-forming unit 2, the outer edge regions of the thermoplastic material blank 9 may be pushed upwardly and inwardly, as shown in phantom, to form a pair of side panels 14 which may extend in generally perpendicular relationship with respect to the planar bottom panel 13. The bottom panel 13 and extending side panels 14 may form a pre-formed thermoplastic composite material segment 12 having a generally U-shaped cross-sectional shape. The pre-formed thermoplastic composite material segment 12 exits the outlet end 2b of the pre-forming unit 2.

The press 3 of the process assembly 1 may have an intake end 3a, which may be adapted to receive the pre-formed thermoplastic composite material segment 12 from the outlet end 2b of the pre-forming unit 2, and an outlet end 3b. The press 3 may be adapted to form a pressed thermoplastic composite material segment 16 having one or multiple material layers or plies (not shown) using the application of heat and pressure to the pre-formed thermoplastic composite material segment 12. The press 3 may have any design known to those skilled in the art which may be suitable for pressing and consolidating one or multiple layers or plies into the composite structure of the formed thermoplastic composite material segment 12.

The curved section 4 of the process assembly 1 may have an intake end 4a, which may be adapted to receive the pressed thermoplastic composite material segment 16 from the press 3, and an outlet end 4b which may be adapted to discharge a curved thermoplastic composite material segment 18 having the selected cross-sectional configuration from the curved section 4. The curved section 4 of the process assembly 1 may have any desired length and radius of curvature depending on the desired length and radius of curvature, respectively, of the curved thermoplastic composite material segment 18 which is to be formed. The transition from the straight configuration of the pressed thermoplastic composite material segment 16 to the curved configuration of the curved thermoplastic composite material segment 18 may be at the appropriate heat zone location in the machine consolidation die to facilitate heating and curving of the pressed thermoplastic composite material segment 16 as it is passed through the curved section 4.

Figure 3:
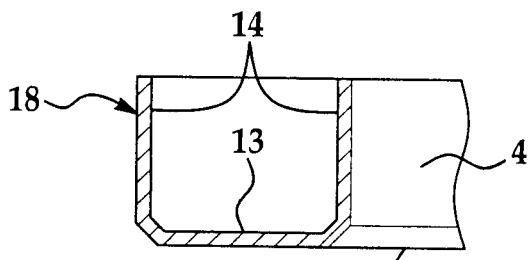
FIG. 3 is a cross-sectional view of a U-shaped curved formed material segment.
Figure 4:
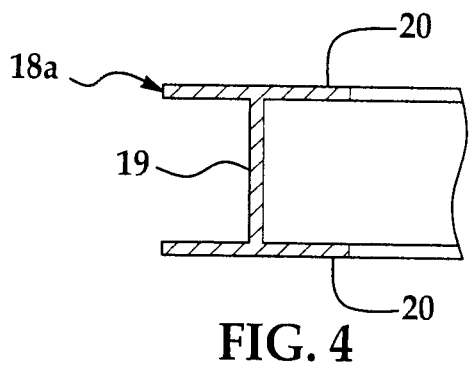
FIG. 4 is a cross-sectional view of an I-shaped curved formed material segment.
Figure 5:
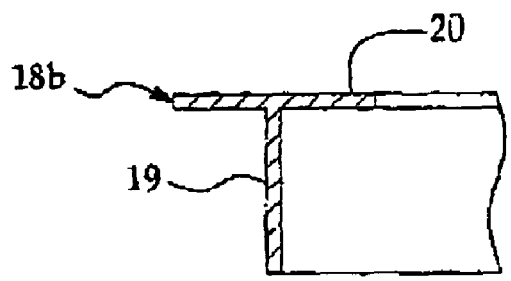
FIG. 5 is a cross-sectional view of a T-shaped curved formed material segment.
Figure 6:
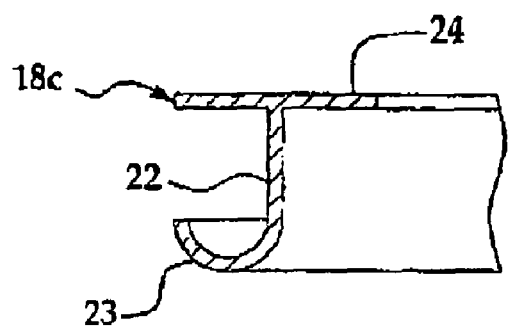
FIG. 6 is a cross-sectional view of a J-shaped curved formed material segment.

Referring next to FIGS. 3-6 of the drawings, alternative cross-sectional configurations of the curved thermoplastic composite material segment 18 which can be formed according to the process for forming curved thermoplastic composite laminate material are shown. As shown in FIG. 4, the process can be used to form a curved thermoplastic composite material segment 18a having a generally I-shaped cross-sectional configuration. The segment 18a may include a web portion 19 and a pair of cap portions 20 which extend along respective edges of the web portion 19. As shown in FIG. 5, the process may be used to form a curved thermoplastic composite material segment 18b having a generally T-shaped cross-sectional configuration. The segment 18b may include a web portion 19 and a cap portion 20 extending along one edge of the web portion 19. As shown in FIG. 6, the process may be used to form a curved thermoplastic composite material segment 18c having a generally J-shaped cross-sectional configuration. The segment 18c may include a web portion 22, a curved base portion 23 in one edge of the web portion 22 and a cap portion 24 extending along the opposite edge of the web portion 22. It is to be understood that the various cross-sectional configurations for the curved thermoplastic composite material segment 18 which were heretofore described and illustrated with respect to FIGS. 3-6 are illustrative only and that curved thermoplastic composite material segments 18 having additional alternative cross-sectional configurations may be formed according to the process.

In typical implementation of the process for forming curved thermoplastic composite ("TPC") laminate material, the thermoplastic composite material blank 9 may be continuously fed into the intake end 2a of the pre-forming unit 2, either in the form of spool-rolled material 9a wound on spools 8 or from stacked material 9b, as shown in FIG. 1, in any defined layup. The pre-forming unit 2 pre-forms the thermoplastic composite material blank 9 into a pre-formed thermoplastic composite material segment 12 having the desired cross-sectional configuration which in the example shown in FIGS. 1-3 is a generally U-shaped cross-sectional configuration. Accordingly, the U-shaped pre-formed thermoplastic composite material segment 12 may have the generally planar bottom panel 13 and the pair of side panels 14 which extend in generally perpendicular relationship with respect to the bottom panel 13.

Figure 7:
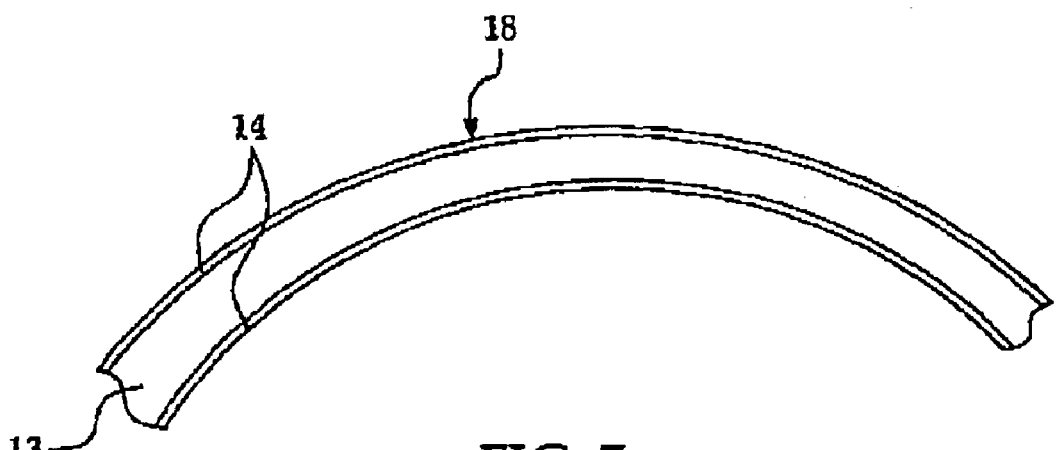
FIG. 7 is a top view, partially in section, of a curved formed material segment.

The pre-formed thermoplastic composite material segment 12 exits the outlet end 2b of the pre-forming unit 2 and enters the intake end 3a of the press 3. The press 3 may utilize heat and pressure to press one or more layers or plies (not shown) of material to form the pressed thermoplastic composite material segment 16. The pressed thermoplastic composite material segment 16 exits the outlet end 3b of the press 3 and enters the intake end 4a of the curved section 4. The curved section 4 forms a curve of selected length and curvature into the pressed thermoplastic composite material segment 16 to form the curved thermoplastic composite material segment 18 having the selected radius of curvature, as shown in FIG. 7. After it exits the outlet end 4b of the curved section 4, the curved thermoplastic composite material segment 18 may be cut to the desired length. The advancing speed and length of the curved thermoplastic composite material 18 may be based on the material, cross-sectional geometry and radius of curvature to eliminate wrinkles (not shown) in the web portion and cap portion or portions of a curved thermoplastic composite material segment 18 having the I-shaped cross-section (FIG. 4), the T-shaped cross-section (FIG. 5) or the J-shaped cross-section (FIG. 6), for example. The process may be carried out using an automated continuous compression molding process.

Figure 8:
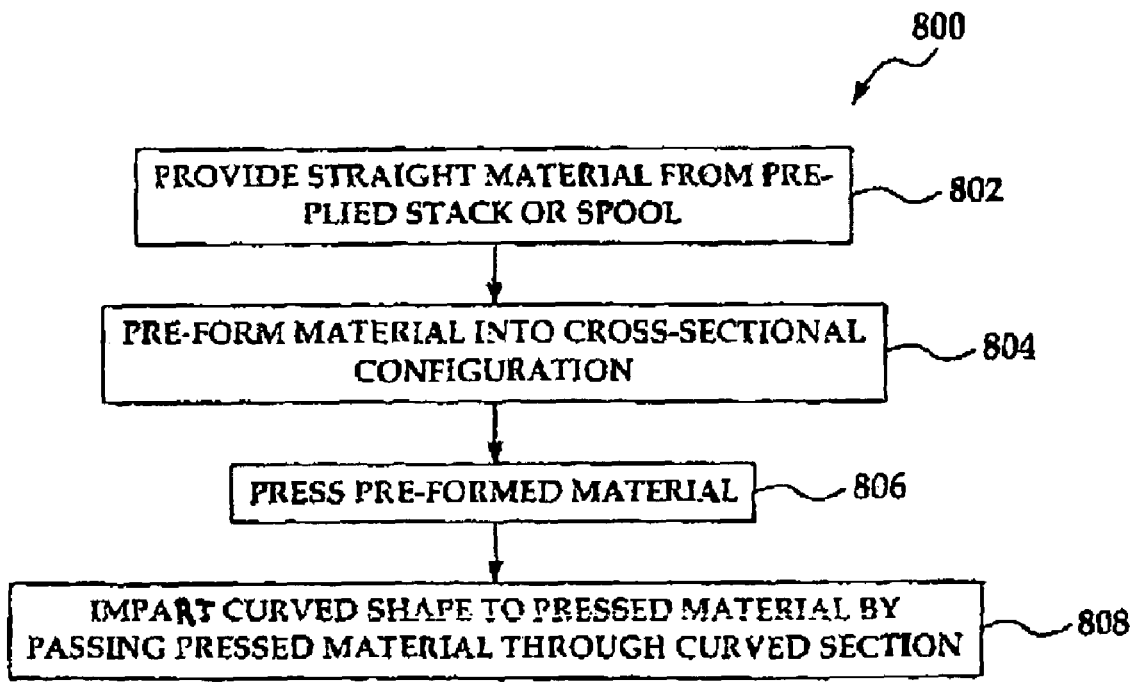
FIG. 8 is a process flow diagram of an exemplary process for forming curved thermoplastic composite material.

Referring next to FIG. 8, a process flow diagram 800 which illustrates an exemplary process for forming a curved thermoplastic composite material segment 18 is shown. The process may include providing straight material from a pre-plied stack or spool as indicated in block 802. The straight material may be, for example, unidirectional tape; woven cloth; or a hybrid combination of unidirectional tape and woven cloth. The material forms which are used in the process may be the same as those which are conventionally used for straight parts that are less wasteful and costly than material stacks for typical curved parts. The process may further include pre-forming the material into a selected cross-sectional configuration in block 804. The selected cross-sectional configuration may be, for example, a U-shape; an I-shape; a T-shape; a J-shape; or any other desired shape. The process may further include pressing the pre-formed material in block 806 and imparting a curved shape to the pressed material in block 808. Imparting the curved shape to the pressed material may include passing the pressed material through a curved section.

Figure 9:
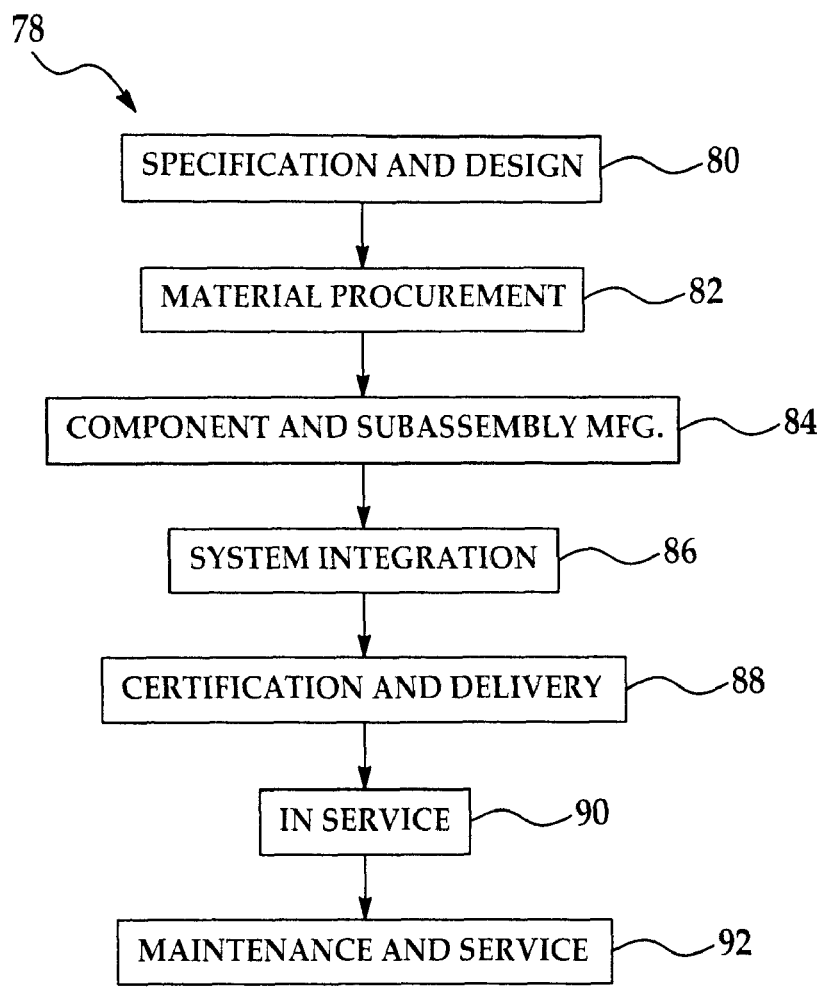
FIG. 9 is a flow diagram of an aircraft production and service methodology.
Figure 10:
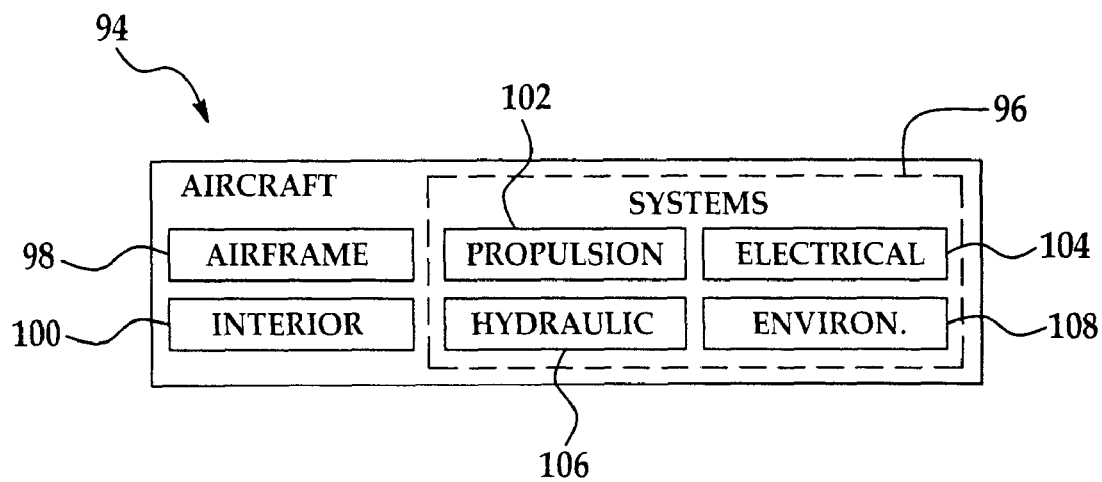
FIG. 10 is a block diagram of an aircraft.

Referring next to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A process for forming curved thermoplastic composite material, comprising the steps of:
   providing a length of straight thermoplastic material;
   pre-forming said length of straight thermoplastic material into a selected cross-sectional configuration;
   pressing said length of straight thermoplastic material in a die press; and
   imparting a curved shape to said length of straight thermoplastic material following said step of pressing by providing a curved section of a process assembly and passing said length of straight thermoplastic material within and through said curved section of the process assembly following said step of pressing.

2. The process of claim 1 wherein said cross-sectional configuration comprises a generally U-shaped cross-sectional configuration, a generally I-shaped cross-sectional configuration, a generally T-shaped cross-sectional configuration or a generally J-shaped cross-sectional configuration.

3. The process of claim 1 wherein said length of straight thermoplastic material comprises unidirectional tape.

4. The process of claim 1 wherein said length of straight thermoplastic material comprises woven cloth.

5. The process of claim 1 wherein said length of straight thermoplastic material comprises a hybrid combination of unidirectional tape and woven cloth.

6. The process of claim 1 wherein said step of providing a length of straight thermoplastic material comprises providing a length of straight thermoplastic material from at least one spool.

7. The process of claim 1 wherein said step of providing a length of straight thermoplastic material comprises providing a length of straight thermoplastic material from a stacked configuration.

8. The process of claim 1 wherein said step of imparting a curved shape to said length of straight thermoplastic material by providing a curved section of a process assembly and passing said length of straight thermoplastic material through said curved section of the process assembly is accomplished entirely in an automated continuous compression molding process.

9. A process for forming curved thermoplastic composite material, comprising the steps of:
   providing a process assembly having sequentially a pre-forming unit, a die press and a curved section disposed in generally linear relationship to each other;
   passing a length of straight thermoplastic material through said pre-forming unit, said press and said curved section, respectively;
   pre-forming said length of straight thermoplastic material into a selected cross-sectional configuration in said pre-forming unit;
   pressing said length of straight thermoplastic material in said press; and
   imparting a curved shape to said length of straight thermoplastic material following said step of pressing as said length of straight thermoplastic material passes within and through said curved section following said step of pressing.

10. The process of claim 9 wherein said cross-sectional configuration comprises a generally U-shaped cross-sectional configuration, a generally I-shaped cross-sectional configuration, a generally T-shaped cross-sectional configuration or a generally J-shaped cross-sectional configuration.

11. The process of claim 9 wherein said length of straight thermoplastic material comprises unidirectional tape.

12. The process of claim 9 wherein said length of straight thermoplastic material comprises woven cloth.

13. The process of claim 9 wherein said length of straight thermoplastic material comprises a hybrid combination of unidirectional tape and woven cloth.

14. The process of claim 9 wherein said step of passing a length of straight thermoplastic material through said pre-forming unit, said press and said curved section, respectively, comprises passing said length of straight thermoplastic material through said pre-forming unit, said press and said curved section, respectively from at least one spool.

15. The process of claim 9 wherein said step of passing a length of straight thermoplastic material through said pre-forming unit, said press and said curved section, respectively, comprises passing said length of straight thermoplastic material through said pre-forming unit, said press and said curved section, respectively from a stacked configuration.

16. The process of claim 9 wherein said step of imparting a curved shape to said length of straight thermoplastic material by providing a curved section of a process assembly and passing said length of straight thermoplastic material through said curved section of the process assembly is accomplished entirely in an automated continuous compression molding process.

17. A process for forming curved thermoplastic composite material, comprising the steps of:
    providing a process assembly having sequentially a pre-forming unit, a die press and a curved section disposed in generally linear relationship to each other;
    continuously passing a length of straight thermoplastic material through said pre-forming unit, said press and said curved section, respectively;
    pre-forming said length of straight thermoplastic material into a selected cross-sectional configuration in said pre-forming unit;
    pressing said length of straight thermoplastic material in said press; and
    imparting a curved shape to said length of straight thermoplastic material following said step of pressing as said length of straight thermoplastic material passes within and through said curved section following said step of pressing.

18. The process of claim 17 wherein said cross-sectional configuration comprises a generally U-shaped cross-sectional configuration, a generally I-shaped cross-sectional configuration, a generally T-shaped cross-sectional configuration or a generally J-shaped cross-sectional configuration.

19. The process of claim 17 wherein said length of straight thermoplastic material is unidirectional tape or woven cloth.

20. The process of claim 17 wherein said length of straight thermoplastic material comprises a hybrid combination of unidirectional tape and woven cloth.

21. The process of claim 17 wherein said step of passing a length of straight thermoplastic material through said pre-forming unit, said press and said curved section, respectively, comprises passing said length of straight thermoplastic material through said pre-forming unit, said press and said curved section, respectively from at least one spool.

22. The process of claim 17 wherein said step of passing a length of straight thermoplastic material through said pre-forming unit, said press and said curved section, respectively, comprises passing said length of straight thermoplastic material through said pre-forming unit, said press and said curved section, respectively from a stacked configuration.

23. The process of claim 17 wherein said step of imparting a curved shape to said length of straight thermoplastic material by providing a curved section of a process assembly and passing said length of straight thermoplastic material through said curved section of the process assembly is accomplished entirely in an automated continuous compression molding process.

* * * * *